Patented Nov. 1, 1927.

1,647,214

UNITED STATES PATENT OFFICE.

DAVID T. DAY, OF WASHINGTON, DISTRICT OF COLUMBIA; FRED J. GOBLE ADMINISTRATOR OF SAID DAVID T. DAY, DECEASED.

INSECTICIDE AND PROCESS OF PREPARING THE SAME.

No Drawing.  Application filed March 7, 1925. Serial No. 13,860.

This invention relates to the production of insecticides from oil shale materials and pertains particularly to the manufacture of dust insecticides by combining with a carrier a material having an insecticidal character such as oily bases and oily acids occurring in shale oil.

It is known that many neutral porous substances, such as spent shales, whether the carbon has been burned from them or not, clays such as fuller's earth, and, diatomaceous earth, have the property of taking from solution, various alkaloidal substances by adsorbing them even when they are present in what seems to be a perfect solution. For instance, Brucine or strichnine in dilute aqueous solutions, when passed through fuller's earth, are removed from the solution so that the liquid is harmless to drink.

In my applications Serial No. 749,570 filed November 12, 1924, and Serial No. 755,316, filed December 11, 1924, are described, processes for the production of oily bases and oily acids from shale oil. It has been found that the various oily bases and oily acids obtained, act in the same way as do the alkaloids mentioned above.

In preparing an insecticide solution of sulphates and other salts of oily bases or oily acids, or solutions or suspensions of the bases and acids themselves in a fluid menstruum may be mixed with a carrier or filtered through a mass of any of the earthy adsorbing agents mentioned above. A dust insecticide, suitable for use as a dust spray, may be prepared by drying the resulting mass at as low a temperature as is practicable. The various oily bases and oily acids found in shale oil, may be classified under the general term of nitrogen-containing compounds characterized by six-membered rings containing an N-member. The presence of these compounds is indicated by the fact that an insoluble precipitate with silico-tungstic acid is obtained. Pyridine and its homologues, and certain members of the quinoline and nicotine series give this test. By analysis of the oily bases and oily acids, compounds of the nicotine series are found to be present, and have the desired insecticidal properties.

One method of making a dust insecticide is by precipitating compounds of the nicotine series from their salt (sulphate) solutions by the interaction of the salt with lime, thus forming one kind of dust consisting of lime sulphate and free nicotine compounds. Shale oil, for example, in which compounds of the nicotine series in the form of sulphates are present, is filtered through lime, preferably milk of lime. The resulting mass is heated at a temperature high enough to drive off the oil and moisture, but below the temperature required to drive off the compounds of the nicotine series. The dried material which consists of an intimate mixture of lime sulphate and compounds of the nicotine series may be finely pulverized suitable for use as a dust spray.

Another method of making an insecticide employed is to filter the oils, such as shale oils containing oily bases and oily acids, through a bed of spent shale, for instance, which will act selectively to retain the said bases and acids and to release the other oily constituents. For example, the oils are slowly filtered through large vats filled with spent shale ¾ full, the shale preferably being porous and of various sizes, but practically small enough to be classed as dust, that, is from 100 mesh down to extremely fine dust. After the oil has filtered through the shale, and after it is found that it will not take up any further appreciable quantity of the oily bases or oily acids, the excess oil may be washed away. The resulting mass may be dried to be sold as a dust insecticide, or some of the adhering original oil may be left in the material and sold in the form of an oily dust.

A third method of preparing an insecticide is by heating an oil, such as shale oil, containing oily bases and oily acids to a temperature between 225° and 300° F. and agitating it with about ⅓ to ⅛ of its weight of powdered spent shale. The shale adsorbs the oily bases and oily acids and the supernatant liquid may be decanted, or filtered off. The solid material may be treated as described above.

Porous spent shale is peculiarly adapted to serve as a carrier in that it has a large adsorbing surface. With it, it is possible to conveniently apply the herein described insect killing compounds to vegetation, in a very concentrated form.

I claim:

1. A process for making an insecticide, which process consists in bringing shale oil oily bases and oily acids present in shale oils, in intimate contact with an earthy substance which constitutes a carrier, allowing the said substance to act selectively to retain the said bases and acids and to release other shale oil constituents, and removing the latter constituents.

2. A process for making an insecticide, which process consists in bringing nitrogen-containing compounds present in shale oils and characterized by six-membered rings containing an N-member, in intimate contact with an earthy substance which constitutes a carrier, allowing the said substance to act selectively to retain the said compounds and to release other shale oil constituents, and removing the latter constituents.

3. A process for making an insecticide, which process consists in bringing shale oil products of the nicotine series embodied in shale oil, in intimate contact with an earthy substance which constitutes a carrier, allowing the said substance to act selectively to retain the said shale oil products of the nicotine series and to release the oil, and removing the oil.

4. A process for making a dust insecticide, which process consists in filtering an oil containing oily bases and oily acids through powdered spent shale which is adapted to selectively adsorb the said oily bases and oily acids, removing the major portion of the neutral constituents of the oil, and then drying the resulting mass.

5. A process for making a dust insecticide, which process consists in filtering an oil containing oily bases and oily acids through powdered spent shale which is adapted to selectively adsorb the said oily bases and oily acids, removing the major portion of the neutral constituents of the oil, and then drying the resulting mass at a temperature high enough to drive off the said neutral constituents of the oil, but at a temperature below that required to drive off the said oily bases and oily acids.

6. A process for making a dust insecticide, which process consists in filtering shale oil containing compounds of the nicotine series through powdered spent shale, removing the major portion of the neutral constituents of the oil, and then drying the resulting mass at a temperature high enough to drive off the said neutral constituents of the oil, but at a temperature below that required to drive off the said compounds.

7. An insecticide consisting of powdered shale, and shale oil oily bases and oily acids.

8. A dust insecticide consisting of a finely divided carrier and shale oil oily bases and oily acids in concentrated form and free from the bulk of the oil.

9. A dust insecticide consisting of finely powdered shale and shale oil products of the nicotine series.

10. A dust insecticide consisting of finely powdered porous shale and shale oil products of the nicotine series adsorbed by said shale.

11. An insecticide containing powdered spent shale, shale oil products of the nicotine series adsorbed by said shale, and shale oil.

12. A process for making a dust insecticide, which process consists in filtering a fluid menstruum containing oily bases and oily acids, through an earthy adsorbing agent which acts selectively to retain the said oily bases and oily acids releasing the other constituents of the said menstruum, and then drying the resulting mass.

13. A process for making a dust insecticide, which process consists in filtering a fluid menstruum containing oily bases and oily acids, through powdered spent shale which adsorbs only the said oily bases and oily acids, and then drying the resulting mass.

14. A dust insecticide consisting of an intimate mixture of powdered spent shale and nitrogen-containing compounds found in shale oils and characterized by six-membered rings containing an N-member.

In testimony whereof I affix my signature.

DAVID T. DAY.